(12) United States Patent
Wang

(10) Patent No.: US 11,410,455 B2
(45) Date of Patent: Aug. 9, 2022

(54) METHOD AND DEVICE FOR FINGERPRINT IMAGE RECOGNITION, AND COMPUTER-READABLE MEDIUM

(71) Applicant: Jian-Hua Wang, New Taipei (TW)

(72) Inventor: Jian-Hua Wang, New Taipei (TW)

( * ) Notice: Subject to any disclaimer, the term of this patent is extended or adjusted under 35 U.S.C. 154(b) by 0 days.

(21) Appl. No.: 17/370,371

(22) Filed: Jul. 8, 2021

(65) Prior Publication Data

US 2022/0114357 A1     Apr. 14, 2022

Related U.S. Application Data

(60) Provisional application No. 63/091,326, filed on Oct. 14, 2020.

(30) Foreign Application Priority Data

May 14, 2021   (CN) .......................... 202110527088.2

(51) Int. Cl.
*G06V 40/13*     (2022.01)
*G06V 40/12*     (2022.01)

(52) U.S. Cl.
CPC ...... *G06V 40/1365* (2022.01); *G06V 40/1359* (2022.01)

(58) Field of Classification Search
None
See application file for complete search history.

(56) References Cited

U.S. PATENT DOCUMENTS

| | | | | |
|---|---|---|---|---|
| 9,122,706 B1* | 9/2015 | Holzschneider | ....... | G06V 40/13 |
| 2003/0076985 A1* | 4/2003 | Moghaddam | ...... | G06V 40/1365 382/124 |
| 2003/0091724 A1* | 5/2003 | Mizoguchi | ......... | G06V 40/1365 427/1 |
| 2012/0189170 A1* | 7/2012 | Uno | .................... | G06V 40/1365 382/115 |
| 2013/0142405 A1* | 6/2013 | Nada | .................. | G06V 40/1365 382/124 |
| 2015/0193665 A1* | 7/2015 | Fukuda | .................. | G06V 10/42 382/115 |
| 2016/0132715 A1* | 5/2016 | Feng | ...................... | G06T 5/001 382/125 |

FOREIGN PATENT DOCUMENTS

| | | |
|---|---|---|
| CN | 106875586 A | 6/2017 |
| CN | 109657528 A | 4/2019 |
| CN | 112183508 A | 1/2021 |

* cited by examiner

*Primary Examiner* — Nicholas J Lee
(74) *Attorney, Agent, or Firm* — The PL Law Group, PLLC

(57) ABSTRACT

A method for fingerprint image recognition according to an embodiment includes ranking a plurality of target feature points acquired from a target fingerprint image according to a feature point attribute, comparing the ranked plurality of target feature points with a plurality of reference feature points in a reference fingerprint image to form an entropy map, and determining whether the target fingerprint image matches the reference fingerprint image according to the entropy map, wherein the entropy map indicates similarity between the target fingerprint image and the reference fingerprint image. The solution of the present disclosure makes full use of the acquired image information of the target fingerprint image for fingerprint recognition, thereby significantly improving the accuracy and effectiveness of fingerprint recognition.

25 Claims, 12 Drawing Sheets

METHOD AND DEVICE FOR FINGERPRINT IMAGE RECOGNITION, AND COMPUTER-READABLE MEDIUM

CROSS-REFERENCE TO RELATED APPLICATION(S)

This application claims the benefit under 35 USC § 119(a) of U.S. provisional Patent Application no. 63/091,326 filed on Oct. 14, 2020, China Patent Application No. 202110527088.2, filed on May 14, 2021, in the China Intellectual Property Office, the entire disclosure of which is incorporated herein by reference for all purposes.

BACKGROUND

1. Technical Field

The present disclosure generally relates to the field of fingerprint recognition. More particularly, the present disclosure relates to a method for fingerprint image recognition, a device for fingerprint image recognition, and a non-transitory computer-readable medium.

2. Background of the Invention

With the widespread use of various electronic devices (including smart terminals) in daily life, safe access by the user has become an important factor to be concerned. To ensure security in use of the devices, various schemes for authenticating the user have been proposed, some of which make use of biometrics of the user. The fingerprint, as one of the biometrics, has become an effective means for security authentication due to its uniqueness. With accurate recognition of the fingerprint, safe access to the device can be effectively protected, thereby preventing embezzlement of an illegal or unauthorized user.

A variety of methods for fingerprint recognition have been proposed and can achieve certain recognition accuracy. However, as the sensor for acquiring fingerprint data becomes more miniaturized, the existing recognition methods as mentioned above cannot adapt to such changes of the sensor, and thus cannot achieve satisfactory recognition accuracy.

SUMMARY

At least in view of the above deficiencies mentioned in the background art, the present disclosure provides a solution for accurately recognizing a fingerprint image. Specifically, in the present disclosure, the target feature points acquired from a target fingerprint image are ranked according to a feature point attribute, and then used for forming an entropy map, and according to the entropy map, it is determined whether the target fingerprint image matches the reference fingerprint image. According to the above solutions, the present disclosure makes full use of the acquired image information for fingerprint recognition, thereby significantly improving the accuracy and effectiveness of fingerprint recognition. To this end, the present disclosure provides solutions in several aspects as described below.

In a first aspect, the present disclosure provides a method for fingerprint image recognition, including: ranking a plurality of target feature points acquired from a target fingerprint image according to a feature point attribute; comparing the ranked plurality of target feature points with a plurality of reference feature points in a reference fingerprint image to form an entropy map, wherein the entropy map indicates similarity between the target fingerprint image and the reference fingerprint image; and determining whether the target fingerprint image matches the reference fingerprint image according to the entropy map.

In an embodiment, the feature point attribute includes sharpness and/or shape uniqueness of the target feature point, and ranking the plurality of target feature points according to the feature point attribute includes ranking the target feature points according to whether the target feature points meet predetermined requirements regarding sharpness and/or shape uniqueness.

In an embodiment, ranking the plurality of target feature points includes: dividing the plurality of target feature points into first-level feature points, second-level feature points, and third-level feature points according to the feature point attribute, wherein the first-level feature point satisfies predetermined requirements regarding both the sharpness and the shape uniqueness, the second-level feature point satisfies predetermined requirements regarding one of the sharpness and the shape uniqueness, and the third-level feature point does not satisfy predetermined requirements regarding any of the sharpness and the shape uniqueness.

In an embodiment, the feature point attribute further includes an information volume proportion regarding an information volume contained in the target feature point, wherein the information volume proportion is related to a position of the target feature point in the target fingerprint image.

In an embodiment, the target feature point located within a boundary of the target fingerprint image has an information volume proportion of 100%, while the information volume proportion of the target feature point located on the boundary of the target fingerprint image is proportional to an area of the target feature point within the boundary.

In an embodiment, comparing the ranked plurality of target feature points with the plurality of reference feature points includes: generating at least one target feature point set based on the plurality of target feature points, wherein each target feature point set includes at least two of the target feature points, and each target feature point set has a corresponding joint level; and comparing each target feature point set with the plurality of reference feature points in the reference fingerprint image.

In an embodiment, comparing the plurality of target feature points with the plurality of reference feature points in the reference fingerprint image to form the entropy map includes: performing, based on the level of each target feature point, a similarity comparison on each target feature point and each reference feature point in the reference fingerprint image, to obtain a similarity score of each target feature point; comparing each similarity score to a predetermined threshold or threshold range to obtain a comparison result, wherein the comparison result is associated with a presentation mode; and presenting each target feature point in a corresponding presentation mode according to the comparison result to form the entropy map.

In an embodiment, presenting each target feature points according to the comparison result includes presenting each target feature point in a preset color according to the comparison result.

In an embodiment, comparing the plurality of target feature points with the plurality of reference feature points in the reference fingerprint image to form the entropy map includes: performing, based on the level of each target feature point, the similarity comparison on each target feature point set and each corresponding reference feature point set in the reference fingerprint image, to obtain a similarity score of each target feature point set; comparing each similarity score to a predetermined threshold or threshold range to obtain a comparison result, wherein the comparison result is associated with a presentation mode; and presenting each target feature point set in a corresponding presentation mode according to the comparison result to form the entropy map.

In an embodiment, presenting each target feature point set according to the comparison result includes presenting each target feature point set in a preset color according to the comparison result.

In an embodiment, determining whether the target fingerprint image matches the reference fingerprint image according to the entropy map includes determining whether the target fingerprint image matches the reference fingerprint image according to the number of, and/or a size of an occupied area of, target feature points in a preset presentation mode in the entropy map.

In an embodiment, determining whether the target fingerprint image matches the reference fingerprint image according to the entropy map includes: inputting the entropy map to a trained neural network model to classify the entropy map as a true entropy map or a false entropy map; determining that the target fingerprint image matches the reference fingerprint image in response to the entropy map classified as a true entropy map; and determining that the target fingerprint image does not match the reference fingerprint image in response to the entropy map classified as a false entropy map.

In a second aspect, the present disclosure provides a device for fingerprint image recognition, including: a processor; and a memory storing program instructions executable by the processor, wherein the program instructions, when executed by the processor, cause the device to perform the operations of: ranking a plurality of target feature points acquired from a target fingerprint image according to a feature point attribute; comparing the ranked plurality of target feature points with a plurality of reference feature points in a reference fingerprint image to form an entropy map, wherein the entropy map indicates similarity between the target fingerprint image and the reference fingerprint image; and determining whether the target fingerprint image matches the reference fingerprint image according to the entropy map.

In a third aspect, the present disclosure provides a non-transitory computer-readable medium storing thereon program instructions for fingerprint image recognition, the program instructions, when executed by at least one processor, causing the following operations to be implemented: ranking a plurality of target feature points acquired from a target fingerprint image according to a feature point attribute; comparing the ranked plurality of target feature points with a plurality of reference feature points in a reference fingerprint image to form an entropy map, wherein the entropy map indicates similarity between the target fingerprint image and the reference fingerprint image; and determining whether the target fingerprint image matches the reference fingerprint image according to the entropy map.

Based on the above description about the solutions of the present disclosure, those skilled in the art may understand that in the solutions provided in the above embodiments, the target feature points acquired from a target fingerprint image are ranked according to a feature point attribute, and then used for forming an entropy map, and according to the entropy map, it is determined whether the target fingerprint image matches the reference fingerprint image. According to the above solutions, the present disclosure makes full use of the acquired image information of the target fingerprint image for fingerprint recognition, thereby significantly improving the accuracy and effectiveness of fingerprint recognition.

BRIEF DESCRIPTION OF THE DRAWINGS

The above and other objects, features and advantages of exemplary implementations of the present disclosure will become readily understandable by reading the following detailed description with reference to the accompanying drawings. In the accompanying drawings, several implementations of the present disclosure are illustrated by way of example but not limitation, and like or corresponding reference numerals indicate like or corresponding parts, in which:

FIG. 2b is a schematic diagram of a first target feature point set in FIG. 2a;

FIG. 3b is a schematic diagram of a second target feature point set in FIG. 3a;

FIG. 4b is a schematic diagram of a third target feature point set in FIG. 4a;

FIG. 4c is a schematic diagram of a fourth target feature point set in FIG. 4a;

FIG. 5b is a schematic diagram of a fifth target feature point set in FIG. 5a;

FIG. 5c is a schematic diagram of a sixth target feature point set in FIG. 5a;

FIG. 11b is an enlarged view of the dashed box portion of FIG. 11a;

FIG. 12b is an enlarged view of one entropy map of FIG. 12a;

DETAILED DESCRIPTION

The technical solutions in the embodiments of the present disclosure will be described clearly and completely below with reference to the accompanying drawings in the embodiments of the present disclosure. Obviously, the described embodiments are only a part, not all, of the embodiments of the disclosure. All other embodiments obtained by those skilled in the art based on the embodiments of the present disclosure without paying any creative effort shall be included in the protection scope of the present disclosure.

As mentioned in the background part, existing recognition methods are capable of achieving fingerprint recognition with the desired recognition accuracy for fingerprint acquisition sensors of relatively large size. However, for fingerprint data acquired by a "small-sized" sensor, the existing recognition methods cannot reach the desired recognition accuracy of a user. In view of the increasing miniaturization of sensors, the present disclosure proposes a new solution for fingerprint image recognition that can adapt to miniaturized fingerprint acquisition sensors and achieve good recognition accuracy. The solution of the present disclosure will be described in detail below with reference to the drawings.

Figure 1:
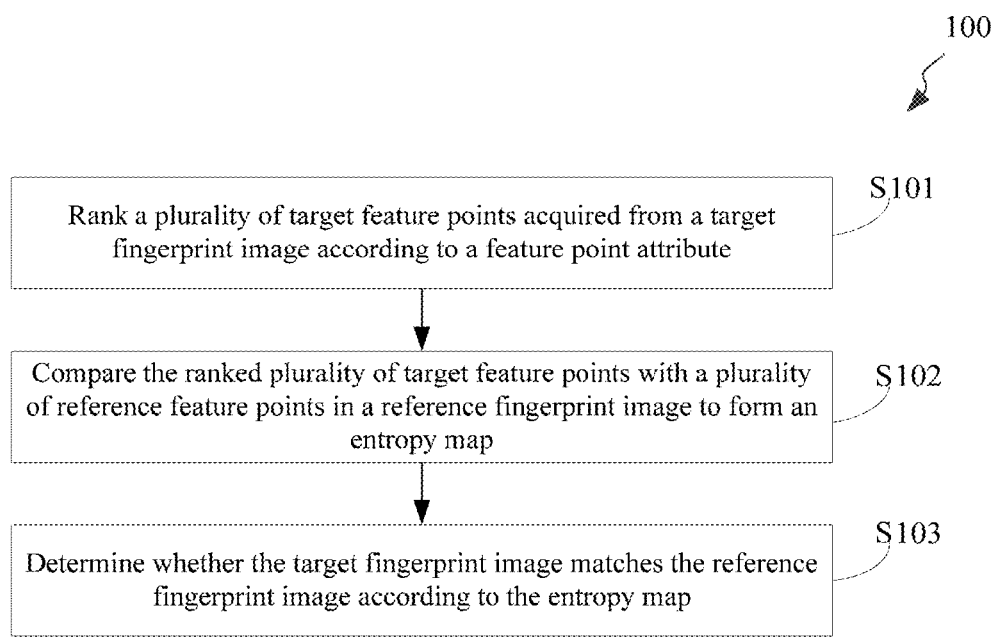
FIG. 1 is a schematic flowchart of a method for fingerprint image recognition according to an embodiment of the present disclosure.

FIG. 1 is a schematic flowchart of a method 100 for fingerprint image recognition according to an embodiment of the present disclosure.

As shown in FIG. 1, the method 100 includes, at step S101, ranking a plurality of target feature points acquired from a target fingerprint image according to a feature point attribute. In a specific implementation scenario, the plurality of (e.g., 50, 90 or 100) target feature points may be acquired from the target fingerprint image by a fingerprint sensor, where the number of target feature points may be determined according to various factors such as the requirements of the application scenario, the sharpness and/or the shape of the target fingerprint image, and the like. Taking the sharpness as an example, more (e.g., 100) target feature points may be acquired when the image is sharp, and relatively fewer (e.g., 50) target feature points may be acquired when the image is blurred.

After the target feature points are acquired, according to an embodiment of the present disclosure, the acquired plurality of target feature points may be ranked according to the sharpness and/or shape uniqueness of the target feature points. In particular, the target feature points may be ranked according to whether they meet predetermined requirements regarding sharpness and/or shape uniqueness. By such ranking, a high-level target feature point will have higher confidence (i.e., a higher score) in the subsequent similarity comparison. Correspondingly, a low-level target feature point will have relatively low confidence.

In an implementation scenario, the plurality of target feature points may be divided into three levels according to the above criteria, where a first-level feature point satisfies predetermined requirements regarding both the sharpness and the shape uniqueness, a second-level feature point satisfies predetermined requirements regarding one of the sharpness and the shape uniqueness, and a third-level feature point does not satisfy requirements regarding any of the sharpness and the shape uniqueness. For example, a target feature point is classified into the first level when the feature point has a sharp image and a unique shape, such as including a break point, a bifurcation point, or an end point in the shape, while a target feature point may be classified into the second level when the feature point has a sharp image but a common shape, or has a unique shape but a blurred image. The common shape may include, for example, a shape that contains only ordinary fingerprint ridges and valleys. Further, a feature point may be classified into the third level when it is both blurred and common in shape. In order to facilitate a better understanding of the three-level classification of the feature points, the target feature points in the target fingerprint image shown in FIGS. 2a, 3a, 4a and 5a and the target feature point sets formed thereby (shown in FIGS. 2b, 3b, 4b, 4c, 5b and 5c, respectively) will be further described below.

Figure 2A:
FIGS. 2a, 3a, 4a and 5a are schematic diagram of different target fingerprint images according to embodiments of the present disclosure, respectively.
Figure 2B:
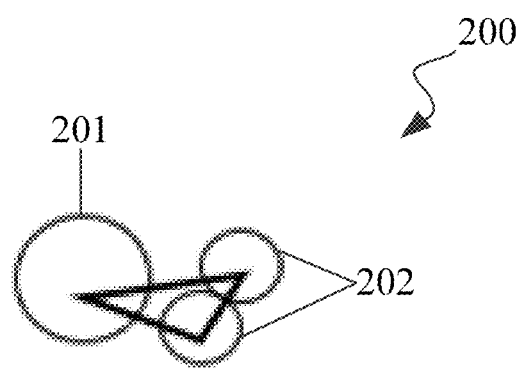

In FIG. 2a, the target feature point 201 is an end point of the fingerprint and has a sharp image, so it is classified into the first level, while the rest two target feature points 202 in the image, having a sharp image but a shape including conventional fingerprint ridges and valleys, are classified into the lower second level. In addition, as can be seen from FIG. 2a, since these three target feature points are concentrated in a small area of the target fingerprint image and are relatively close in position, these three target feature points may constitute a first target feature point set 200 (as shown in FIG. 2b). Further, since the target feature points constituting the first target feature point set 200 are respectively classified into the higher first level and second level, the level of the first target feature point set 200 may be set as a first joint level.

Figure 3A:
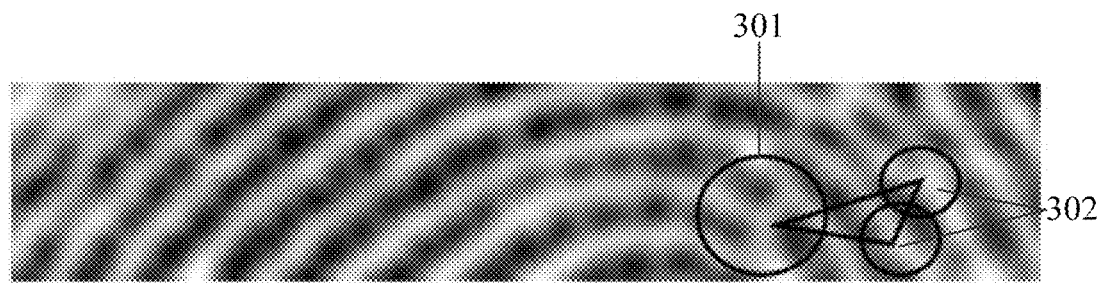
Figure 3B:
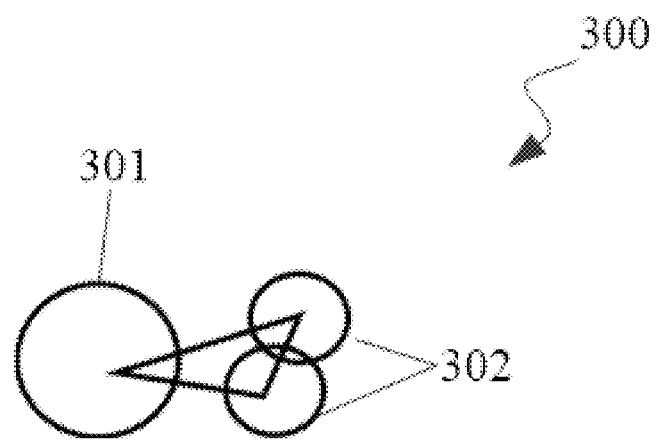

FIG. 3a also shows a target fingerprint image including three target feature points, i.e., a target feature point 301 and two target feature points 302 located at one side of the target feature point 301 and close to the target feature point 301. As can be seen from FIG. 3a, the target feature point 301 has a shape being a bifurcation point of the fingerprint and a sharp image, so it is classified into the first level, while the rest two target feature points 302, having a sharp image but a shape including conventional fingerprint ridges and valleys, are classified into the second level. In addition, since the locations of the target feature point 301 and the two target feature points 302 are concentrated in a small area of the boundary of the target fingerprint image and are relatively close in position, these target feature points may constitute a second target feature point set 300 (as shown in FIG. 3b). Further, since the target feature points included in the second target feature point set 300 are respectively classified into the first level and the second level, a level of the second target feature point set 300 may be set to be the first joint level.

FIGS. 2a and 3a both only show a scenario containing two levels of target feature points, and to facilitate a more comprehensive understanding of the division mode of multiple levels of feature points in the present disclosure, further illustration will be given below with reference to FIGS. 4a and 5a in which multiple levels and more feature points are shown.

Figure 4A:
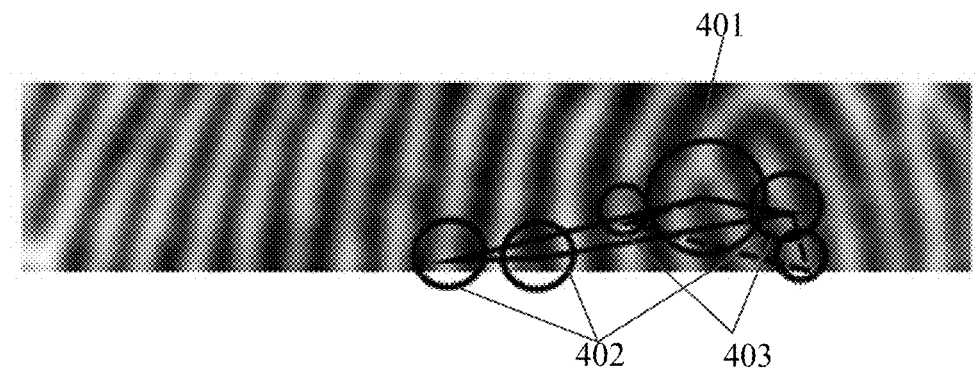
Figure 4B:
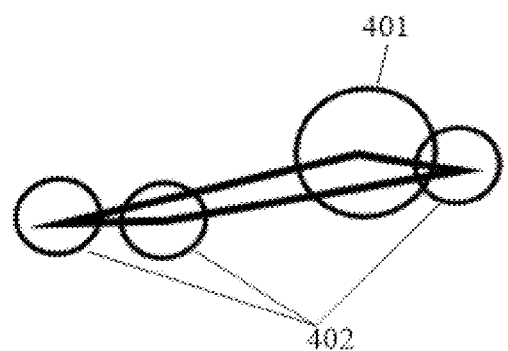

The target fingerprint image shown in FIG. 4a includes a target feature point 401 and three target feature points 402 located on both sides of the target feature point 401. The target feature point 401 has a shape being a bifurcation point of the fingerprint and a sharp image, so it may be classified into the first level, while the three target feature points 402, having a sharp image but a shape including only conventional fingerprint ridges and valleys, are classified into the second level. In addition, since the three target feature points 402 are close to the target feature point 401, and these target feature points are relatively close in position, these four target feature points may constitute a third target feature point set 4001 (as shown in FIG. 4b). Further, since the third target feature point set 4001 includes the same levels of target feature points as those in the first target feature point set 200 or second target feature point set 300, a level of the third target feature point set 4001 may be accordingly set to the higher first joint level.

Figure 4C:
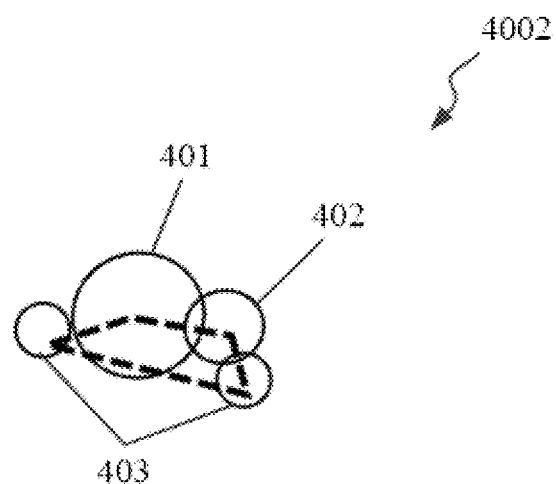

Two target feature points 403 are further distributed on both sides of the target feature point 401 in FIG. 4a. As can be seen from FIG. 4a, the two target feature points 403, having a shape including fingerprint ridges and valleys and a blurred image, are classified into the third level. The two target feature points 403, the target feature point 401, and the target feature point 402 intersecting the target feature point 401 are connected and are relatively close in position, so these four target feature points may constitute a fourth target feature point set 4002 (as shown in FIG. 4c). Further, since the fourth target feature point set 4002 includes not only feature points of the higher first and second levels, but also feature points of the lower third level, a level of the fourth target feature point set 4002 may be accordingly set to a lower second joint level.

Figure 5A:
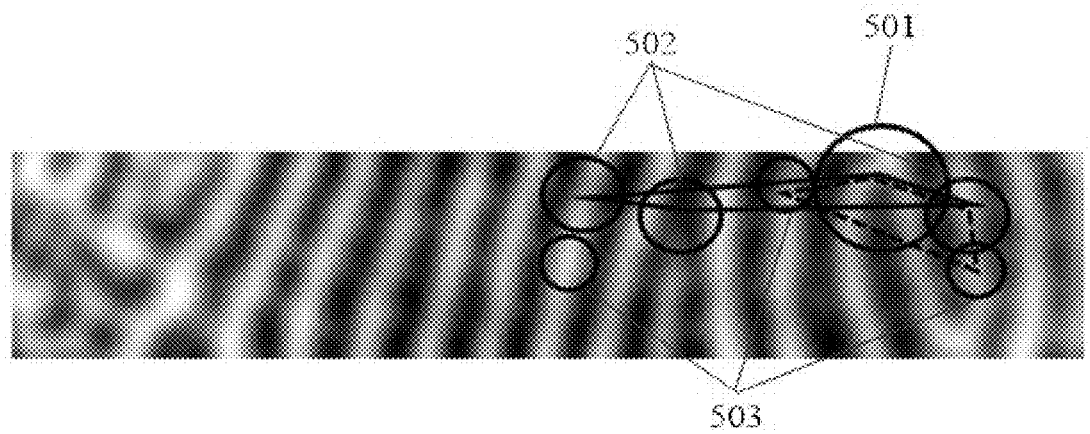

FIG. 5a exemplarily shows a schematic diagram of a target fingerprint image. The target fingerprint image includes a target feature point 501, three target feature points 502 located on both sides of the target feature point 501, and three target feature points 503. As can be seen from FIG. 5a, the target feature point 501 has a shape being a bifurcation point of the fingerprint and a sharp image, the three target feature points 502 have a sharp image but a conventional shape (fingerprint ridges and valleys), and the three target feature point 503 have a shape including only fingerprint ridges and valleys and a blurred image, so the target feature point 501, the target feature points 502 and the target feature points 503 are classified into the first level, the second level and the third level, respectively.

Figure 5B:
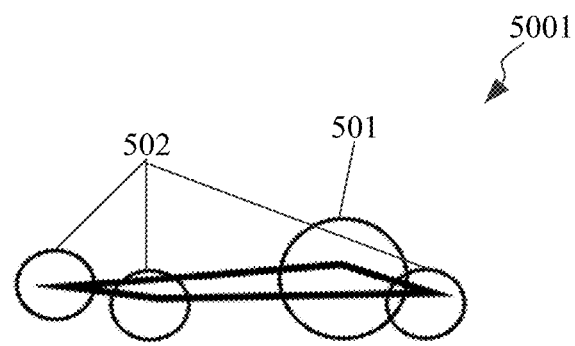

In FIG. 5a, the three target feature points 502 and the target feature points 501 are distributed concentratively in position, so these four target feature points may constitute a fifth target feature point set 5001 (as shown in FIG. 5b), and since the target feature points included in the fifth target feature point set 5001 are of relatively higher levels (first level and second level), a level of the fifth target feature point set 5001 may be accordingly set to the higher first joint level.

Figure 5C:
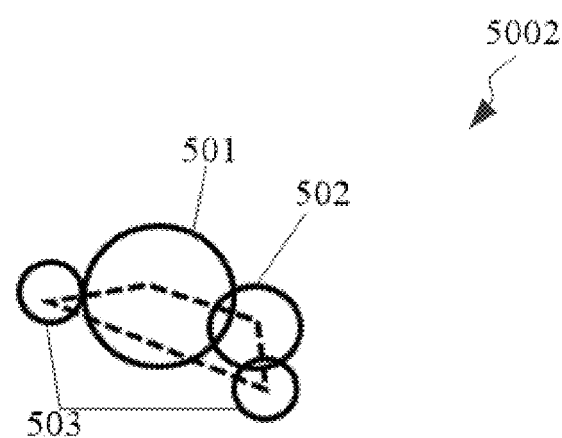

As can also be seen from FIG. 5a, the two target feature points 503, the target feature point 501, and the target feature point 502 intersecting the target feature point 501 are connected and are relatively close in position, so these four target feature points may constitute a sixth target feature point set 5002 (as shown in FIG. 5c). In addition, since the sixth target feature point set 5002 includes both higher levels of target feature points (target feature points of the first and second levels) and lower levels of target feature points (target feature points of the third level), a level of the sixth target feature point set 5002 may be accordingly set to the second joint level.

The ranking mode of target feature points based on shape uniqueness and sharpness has been described in detail above with reference to FIGS. 2a to 5c. It can be seen that the above ranking mode and the setting of the joint levels make full use of characteristics (such as shape uniqueness and image sharpness) of the target feature points, and fully considers confidence of each target feature point in fingerprint recognition, thereby obtaining a more accurate recognition result.

In some implementation scenarios, use of the information of an image boundary area may also be considered. To this end, the present disclosure proposes a ranking scheme considering an information volume proportion regarding an information volume contained in the target feature point. Specifically, In this scheme, the information volume proportion of the information volume contained in the target feature points acquired on the boundary area of the fingerprint image to be recognized may be treated as a factor of ranking, so that the image information of the boundary area can be used in the ranking, and the accuracy of fingerprint recognition is further improved.

Further, the information volume proportion of the information volume contained in the target feature point is related to a position of the target feature point in the target fingerprint image. For example, the target feature point located within a boundary of the target fingerprint image has an information volume proportion of 100%, while the information volume proportion of the target feature point located on the boundary of the target fingerprint image is proportional to an area of the target feature point within the boundary. This ranking mode is further explained below in conjunction with FIGS. 6 and 7.

Figure 6:
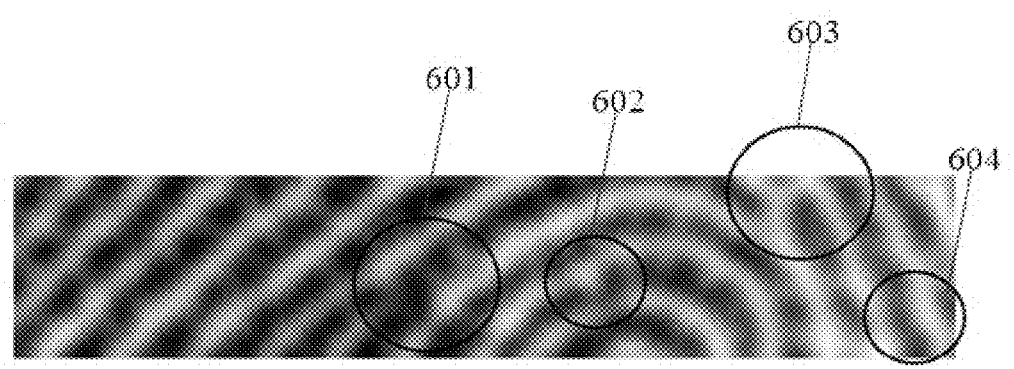
FIG. 6 is a schematic diagram of a target fingerprint image according to an embodiment of the present disclosure.

As shown in FIG. 6, the target feature point 601 and the target feature point 602 are both within the boundary of the target fingerprint image, having an information volume proportion of 100%. The target feature point 601 has a unique shape (bifurcation point of the fingerprint) and a sharp image, and thus is classified into a feature point of the first level, while the target feature point 602, having a sharp image but a shape including merely conventional fingerprint ridges and valleys, is classified into a feature point of the second level. The target feature point 603 on the boundary area of the target fingerprint image has only 75% thereof within the boundary of the target fingerprint image, and thus has an information volume proportion of 75%. Although corresponding to a lower information volume proportion, the target feature point 603 has a relatively unique shape (end point of the fingerprint) and a relatively sharp image, and may be classified into a feature point of the first level. The target feature point 604 on the rightmost side of the target fingerprint image has 90% thereof within the boundary of the target fingerprint image, and thus has an information volume proportion of 90%. However, it has a relatively conventional shape (fingerprint ridges and valleys), and thus is classified into a feature point of the second level despite its sharp image.

Figure 7:
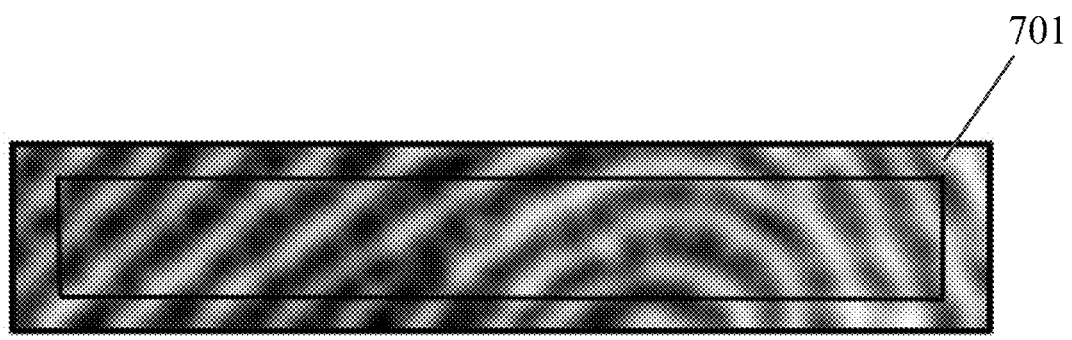
FIG. 7 is a schematic diagram of another target fingerprint image according to an embodiment of the present disclosure.

Taking the target fingerprint image shown in FIG. 7 as an example, by using the information volume proportion of the contained information as a factor of the ranking, not only the image information within the boundary, but also parts of the image information on the boundary area 701 (which generally cannot be used in the prior art), can be used. Since the boundary information is also used in the ranking, the ranking mode of the present disclosure can obviously improve the accuracy of fingerprint recognition compared with the prior art.

FIGS. 2a to 6 illustrate a method for dividing three levels of the target feature points, but those skilled in the art can understand that, in order to adapt to different application scenarios, the target feature points may be divided into more levels (for example, four or five levels), which is not described in detail herein.

The above has exemplarily explained the ranking of the target feature points in detail with reference to step S101. Now, continuing with the flowchart of FIG. 1, the method 100 includes, at step S102, comparing the ranked plurality of target feature points with a plurality of reference feature points to form an entropy map. In the solution of the present disclosure, the entropy map may be formed in two methods, which will be described in detail below through different embodiments.

The first method for forming the entropy map may be implemented by comparing the target feature points separately as described above, i.e., comparing each of the target feature points individually. Specifically, in the comparison, the similarity comparison may be performed on each target feature point and each corresponding reference feature point in the reference fingerprint image to obtain corresponding similarity scores according to different levels of the target feature points. For example, when compared with the reference fingerprint image, if both a high-level target feature point and a low-level target feature point are similar to the corresponding reference feature points, the high-level target feature point has a higher similarity score than the low-level target feature point because the high-level target feature point has higher confidence than the low-level target feature point.

Taking the target feature points as described before in FIG. 4a as an example, if the similarity between the target feature points and the respective reference feature points is identical, the similarity score of the first-level target feature point 401 may be, for example, 100, the similarity score of the second-level target feature point 402 may be, for example, 50, and the similarity score of the third-level target feature point 403 may be, for example, only 20. It will be understood that the scores herein are merely exemplary and are not intended to limit the disclosure in any way.

After being obtained in the above comparison method, the similarity scores are compared with a predetermined threshold or threshold range (which may be specifically set according to, for example, the accuracy of fingerprint recognition) respectively to obtain comparison results, and the corresponding target feature points are presented in a corresponding presentation mode (e.g., in a preset color) according to the obtained respective comparison results to finally form the entropy map. In an embodiment, the comparison result may be a difference between the similarity score and the threshold.

The specific presentation mode in which the target feature points are presented by color is further described below by way of example. For example, when the comparison result falls into a first result range, the corresponding target feature point presents a dark green pattern in the entropy map. When the comparison result falls into a second result range, the corresponding target feature point presents a light green pattern in the entropy map. Further, when the comparison result falls into a third result range, the corresponding target feature point presents a gray pattern in the entropy map. As can be seen from this example, target feature points of different levels of similarity may present different colors in the entropy map. In the illustrated entropy maps, an approximate proportion of each color of target feature points, and an approximate distribution, matching state of the colors, and similar or dissimilar areas can be observed.

In order to meet the requirements of different application scenarios, in an embodiment, each target feature point may be further presented by shape or size in addition to being presented by color in terms of similarity, and this presentation mode has a similar effect to color presentation. For example, when taking shape as the presentation mode, if the comparison result falls into the first result range, the corresponding target feature point presents a circular pattern in the entropy map. If the comparison result falls into the second result range, the corresponding target feature point presents a triangular pattern in the entropy map. Further, if the comparison result falls into the third result range, the corresponding target feature point presents a rectangular pattern in the entropy map.

The first method for forming an entropy map by performing comparison in units of target feature points has been fully described above in conjunction with the various embodiments. As can be seen from the above description of the embodiments, characteristics (e.g., ranks) of the target feature points themselves are considered in the formation of the entropy map, which can be used to improve the accuracy of fingerprint recognition.

The second method for forming an entropy map involves forming the entropy map by comparing the relative relations between the target feature points in a target feature point set (see the foregoing embodiments for more details). In an embodiment, when the comparison is performed using a target feature point set, separate similarity comparison may be firstly performed on each target feature point according to its own level (which is same as the embodiments described above and thus is not repeated here). Then, it is compared to judge whether the positional relations of the target feature points in the target feature point set are the same as in a reference feature point set, and a similarity score is obtained according to a specific comparison result and the levels of the respective target feature points.

Taking the first target feature point set 200 in FIG. 2b as an example, when the similarity comparison is performed on the target feature point set, it is firstly compared whether the target feature point 201 and the two target feature points 202 are similar to the corresponding reference feature points, and then, whether the reference feature points in the reference feature point set also form a triangle in terms of the positional relation. After all the feature points are compared, a final similarity score of the whole set is obtained. In some scenarios, when the above positional relations are the same, the similarity scores of the respective target feature points in the corresponding target feature point set are higher. When the above positional relations are different, the similarity scores of the target feature points are lower, but still higher than the scores when the comparison is performed only relying on the target feature points. Those skilled in the art will understand that the higher the joint level of the target feature point set is, the higher the similarity score of each target feature point within it will be.

From the above description, it can be understood that, by performing the similarity comparison using the target feature point set, not only the characteristics of the target feature points themselves, but also the relations (such as a relative positional relation) among multiple feature points can be fully utilized, so that the target feature points contained therein have higher confidence than in the comparison performed relying on only the target feature points, and thus, the accuracy of fingerprint recognition is further improved.

After the similarity score of each target feature point set is obtained, each similarity score is compared to a predetermined threshold or threshold range (which may be specifically set according to needs), to obtain a comparison result, and then, each target feature point set is presented in a corresponding presentation mode (e.g., in a preset color) according to the comparison result. Specifically, after the range of each comparison result is obtained, each target feature point is correspondingly presented according to its own level in the range to form an entropy map.

For example, for a target feature point set including three levels of target feature points, when the comparison result falls into a first result range, the first level of feature points therein each present a dark green pattern in the entropy map, the second level of feature points each present a light green pattern in the entropy map, and the third level of feature points each present a gray pattern in the entropy map. When the comparison result falls into a second result range, the first level of feature points therein each present a light green pattern in the entropy map, the second level of feature points each present a gray pattern in the entropy map, and the third level of feature points each present a red pattern in the entropy map. When the comparison result falls into a third result range, all the target feature points therein each present a red pattern in the entropy map.

The process of forming an entropy map has been described above, and now return to the flowchart of FIG. 1. The method 100 includes, at step S103, determining whether the target fingerprint image matches the reference fingerprint image according to the entropy map formed in the above embodiments.

Based on the features of the entropy maps (presenting different similarity levels of target feature points in different presentation modes) described in the above embodiments, it may determine whether the target fingerprint image matches the reference fingerprint image according to the number of, and/or a size of an occupied area of, target feature points in a preset presentation mode in the entropy map. For example, the above determination is made based on a magnitude relation between a proportion of the number of target feature points presenting a preset color in the total number of target feature points and a preset proportion.

Figure 8:
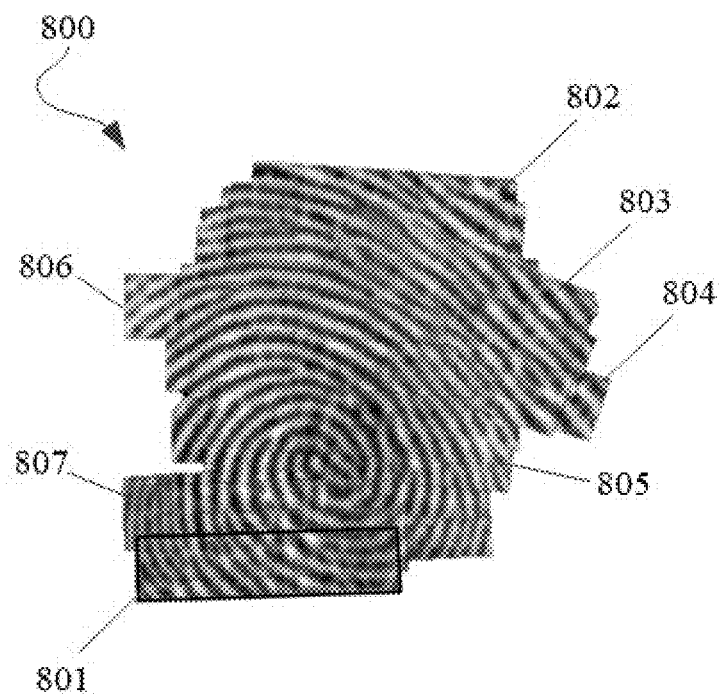
FIG. 8 is a comparison of a target fingerprint image and a reference fingerprint image according to an embodiment of the present disclosure.
Figure 9:
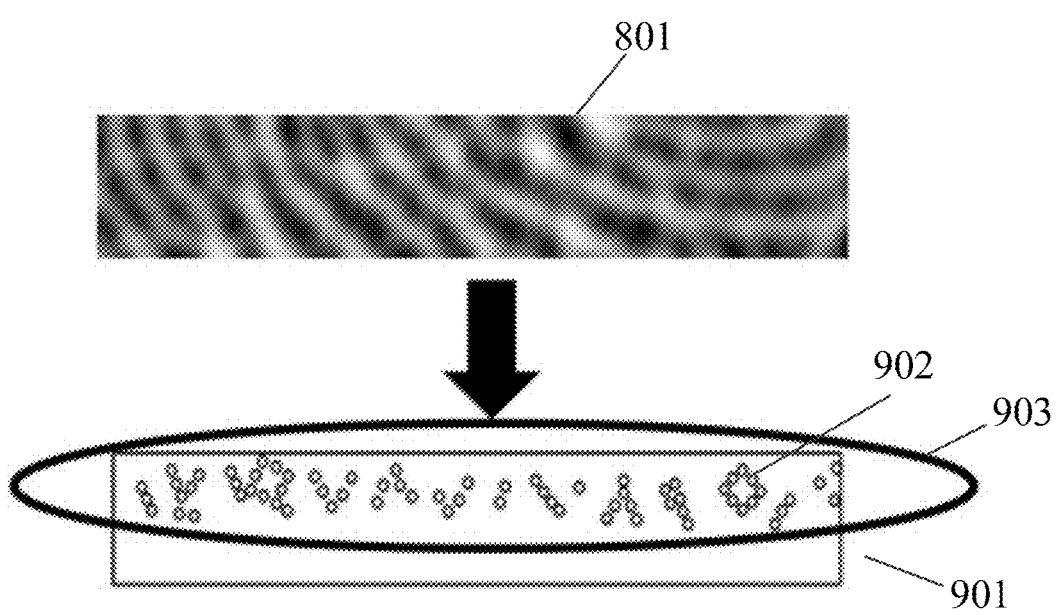
FIG. 9 is an entropy map resulting from the comparison of FIG. 8.
Figure 10:
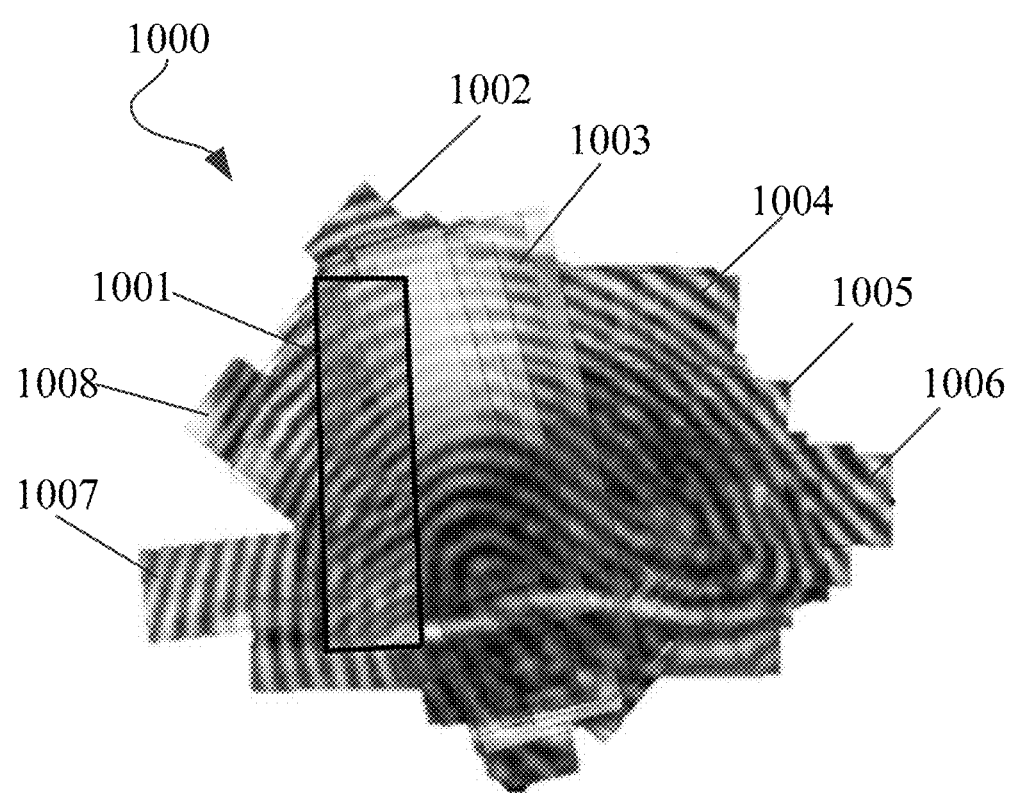
FIG. 10 is a comparison of a target fingerprint image and a reference fingerprint image according to an embodiment of the present disclosure.
Figure 11A:
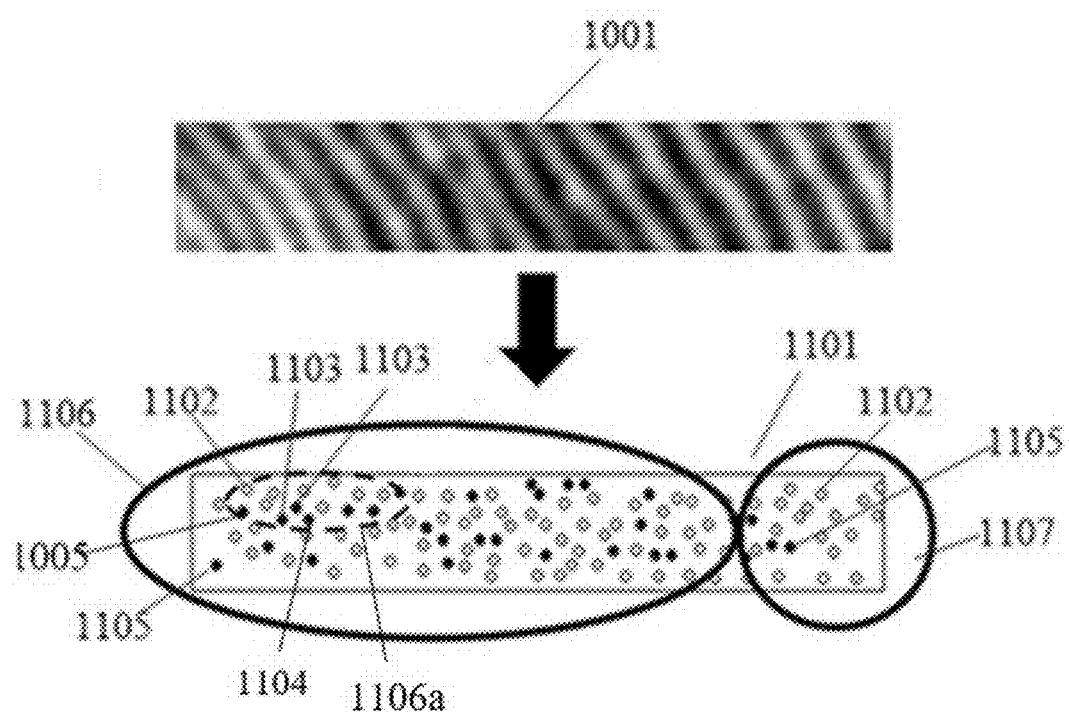
FIG. 11a is an entropy map resulting from the comparison of FIG. 10.
Figure 11B:
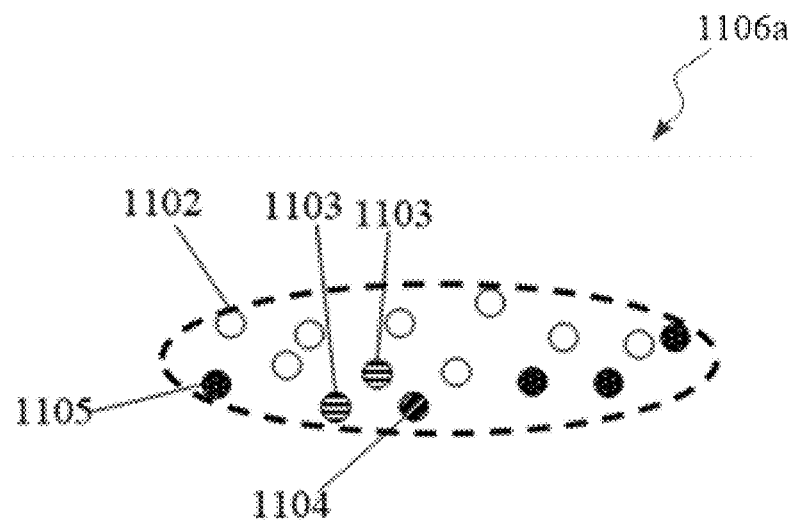

A detailed description will be given below in conjunction with FIGS. 8 to 11b to explain the specific method for judging whether the images match or not using an entropy map (dots corresponding to target feature points in FIGS. 9, 11a and 11b are filled with different patterns to distinguish different similarity scores of the target feature points).

In the embodiments shown in FIGS. 8 to 11b, assuming that a proportion of the number of target feature points presenting a dark green pattern (exemplarily shown by dark dots filled with white in FIG. 9) in the total number of target feature points is greater than 50%, it is determined that the target fingerprint image matches the reference fingerprint image, while it is determined that the target fingerprint image does not match the reference fingerprint image when the proportion is less than or equal to 50%. In this embodiment, a target feature point presenting dark green is set as a feature point of a higher similarity score, or simply understood as being similar to the reference feature point.

As shown in FIG. 8, the image with reference number 801 is a target fingerprint image, while other fingerprint images (for example, fingerprint images with reference numbers 802 to 807) are a plurality of reference fingerprint images acquired by a fingerprint sensor after a finger is pressed on the fingerprint sensor for a plurality of times. The plurality of reference fingerprint images constitute a reference fingerprint image 800 of the finger.

In fingerprint recognition, the target fingerprint image 801 is respectively matched with different positions of fingerprint images in the reference fingerprint image 800 of the finger through rotational or horizontal movements or the like, to search for a reference fingerprint image to be compared (the reference fingerprint image to be compared is below the target fingerprint image 800 in the figure, and thus is not shown), and then each target feature point in the target fingerprint image 800 is compared with a corresponding reference feature point in the reference fingerprint image to be compared, to form the entropy map 901 shown in FIG. 9.

As can be seen from FIG. 9, all the target feature points in the entropy map 901 are presented as a dark green pattern 902, and based on the previously set judgment rule (determining that the images match when a proportion of the number of target feature points presenting a dark green pattern in the total number of target feature points is greater than 50%), it is determined that the target fingerprint image 801 in FIG. 8 matches the reference fingerprint image to be compared. In the entropy map 901, since the target feature points presenting a dark green pattern are all located within an area 903, the area 903 is determined as a high similarity area.

In FIG. 10, the image with reference number 1001 is a target fingerprint image, while other fingerprint images (for example, fingerprint images with reference numbers 1002 to 1007) are a plurality of reference fingerprint images acquired by a fingerprint sensor after a finger is pressed on the fingerprint sensor for a plurality of times, and these plurality of reference fingerprint images constitute a reference fingerprint image 1000 of the finger.

Similar to the method of FIG. 8, a reference fingerprint image to be compared is found by searching (the reference fingerprint image to be compared is below the target fingerprint image 1000 in the figure, and thus is not shown), and then each target feature point in the target fingerprint image 1001 is compared with a corresponding reference feature point in the reference fingerprint image to be compared, to form the entropy map 1101 shown in FIG. 11a.

FIG. 11b shows an enlarged view of the dashed box portion 1106a in the entropy map 1101, and as shown in FIGS. 11a and 11b, the entropy map 1101 is divided into two areas, i.e., an area 1106 and an area 1107, according to the colors presented by the target feature points therein. 30% of the target feature points (e.g., the target feature point denoted by reference number 1102) in the area 1106 each present a dark green pattern, 15% of the target feature points (e.g. the target feature point denoted by reference number 1104) each present a light green pattern (exemplarily shown by black dots filled with multiple white diagonal lines), 15% of the target feature points (e.g. the target feature point denoted by reference number 1103) each present a gray pattern (exemplarily shown by black dots filled with multiple white horizontal lines), while the rest 40% of the target feature points (e.g. the target feature point denoted by reference number 1105) each present a red pattern (exemplarily shown by black dots filled with multiple white dots).

90% of the target feature points (e.g., the target feature point denoted by reference number 1102) in the area 1107 present a dark green pattern, while the rest target feature points (e.g., the target feature point denoted by reference number 1105) present a red pattern. It can be seen that the area 1106 is a low similarity area, while the area 1107 is a high similarity area. From the perspective of the entire entropy map 1101, said proportion corresponding to the target feature points presenting a dark green pattern is less than 50%. Therefore, it is determined that the target fingerprint image 1001 in FIG. 10 does not match the corresponding reference fingerprint image.

In the embodiments of FIGS. 8 to 11b for judging whether the images match or not, the judgment is performed by counting the number of target feature points (including the number of target feature points presenting the preset color and the total number of target feature points) and analyzing a proportion of the number of target feature points presenting the preset color in the total number of target feature points, thereby achieving a higher accuracy of recognition.

In order to accelerate the judgment of match or not, the present disclosure further proposes directly inputting the entropy map to a trained neural network model to judge whether the images match. In an embodiment, the neural network model may classify the entropy map into a true entropy map or a false entropy map according to preset classification criteria, and determine whether the target fingerprint image matches the reference fingerprint image according the true or false entropy map.

The above classification criteria may include the magnitude relation between the proportion of the number of target feature points presenting a preset color in the total number of target feature points and the preset proportion as described in the above embodiments. For example, when the number of target feature points of a certain preset color in an entropy map account for at least 50% (which is assumed to be the preset proportion) of all target feature points in the whole entropy map, the entropy map may be classified as a true entropy map; otherwise, the entropy map is classified as a false entropy map. In addition, corresponding feature points in FIGS. 12a, 12b, 13a, 13b and 13c have the same presentation modes and meanings as those in FIGS. 9, 11a and 11b.

Figure 12A:
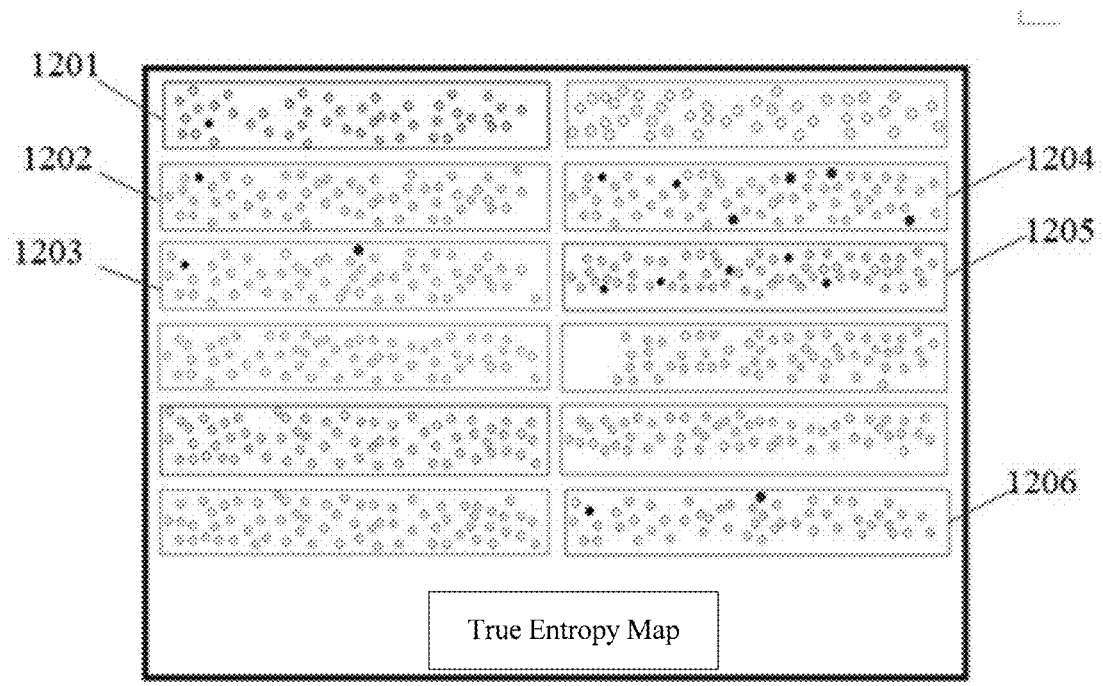
FIG. 12a is a schematic diagram of true entropy maps according to an embodiment of the present disclosure.
Figure 12B:
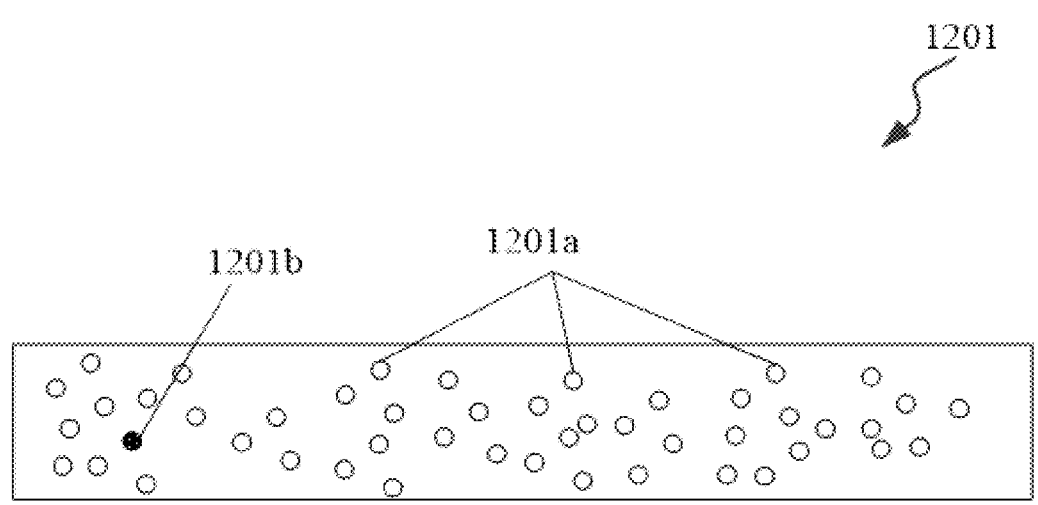

FIG. 12a exemplarily shows a plurality of true entropy maps 1201-1206, while FIG. 12b shows an enlarged view of an entropy map 1201 therein. As can be seen from FIG. 12b, the entropy map 1201 includes feature points 1201a presenting a dark green pattern and feature points 1201b presenting a red pattern, where the proportion of the number of feature points 1201a in the total number of feature points is 99%, and the proportion of the number of feature points 1201b in the total number of feature points is 1%. In short, the discussed proportion in the entropy map 1201 is greater than 50%, and thus, the entropy map 1201 is classified as a true entropy map.

Figure 13A:
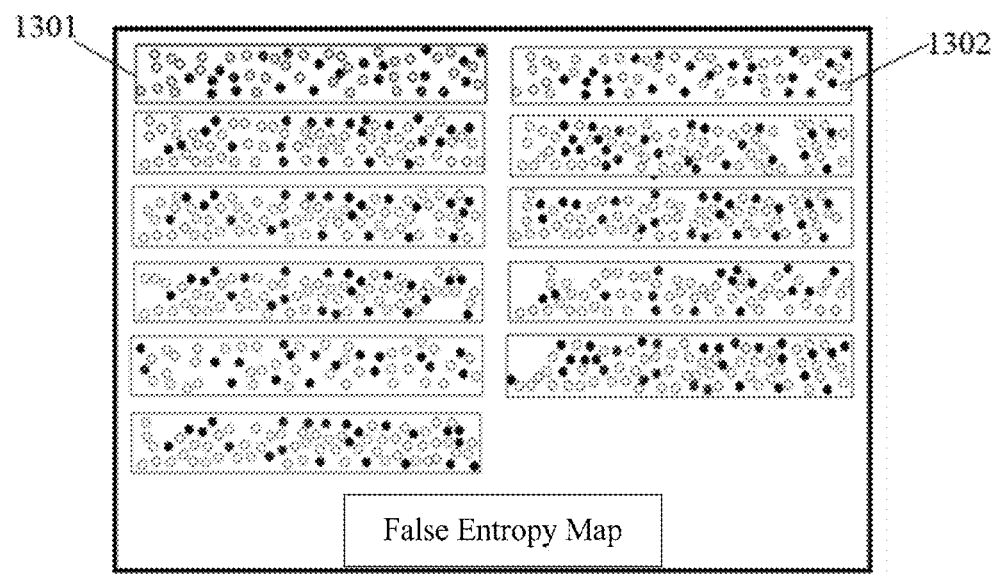
FIG. 13a is a schematic diagram of false entropy maps according to an embodiment of the present disclosure.
Figure 13B:
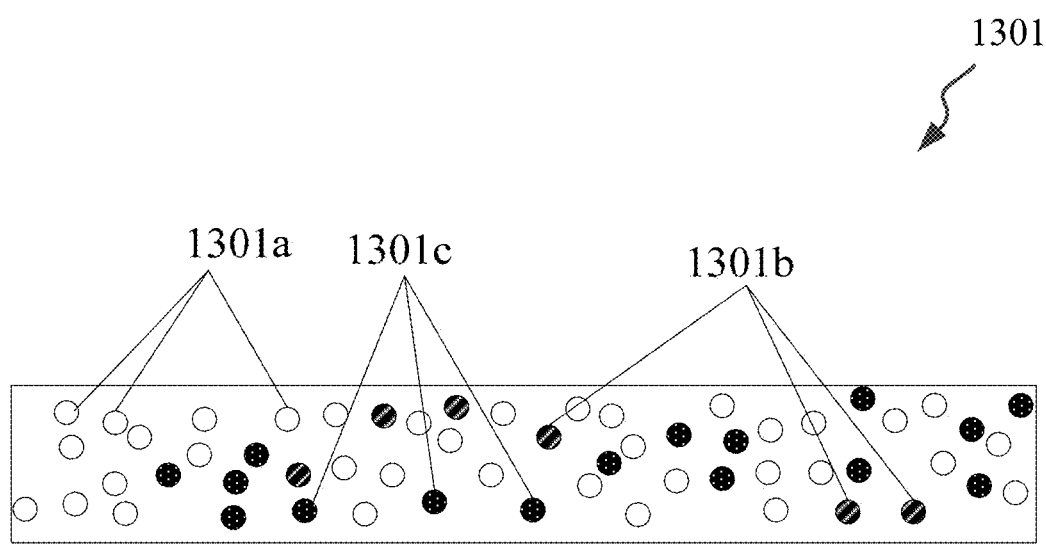
FIGS. 13b and 13c are enlarged views of two entropy maps of FIG. 13a, respectively.

FIG. 13b shows an enlarged view of an entropy map 1301 in FIG. 13a. As can be seen from FIG. 13b, the entropy map 1301 includes feature points 1301a presenting a dark green pattern, feature points 1301b presenting a light green pattern and feature points 1301c presenting a red pattern, where the proportion of the number of feature points 1301a in the total number of feature points is 40%, and the proportions of the number of feature points 1301b and feature points 1301c in the total number of feature points are respectively 20% and 40%. It can be seen that the entropy map 1301 corresponds to a proportion less than 50%, and thus, the entropy map 1301 is classified as a false entropy map.

Figure 13C:
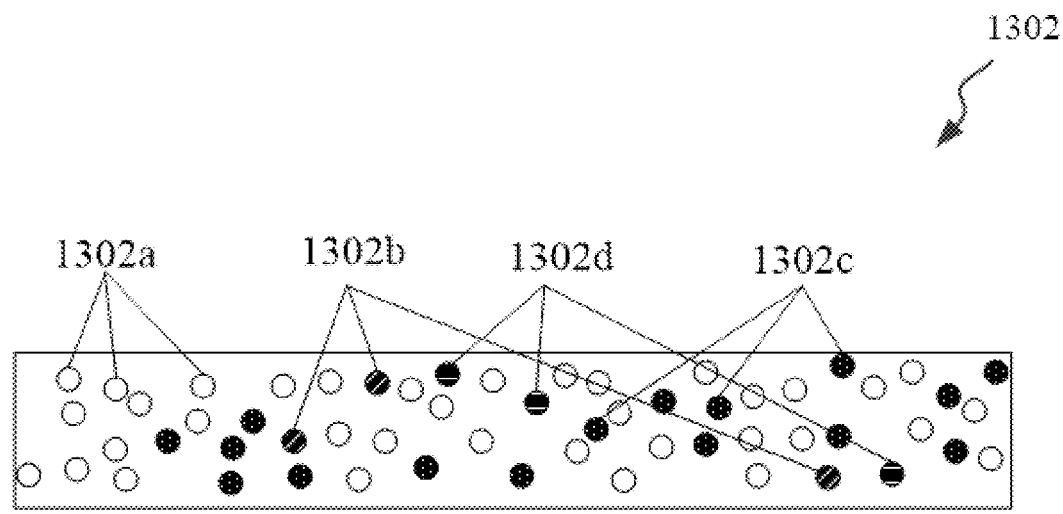

FIG. 13c shows an enlarged view of the entropy map 1302 of FIG. 13a, which, in addition to feature points 1302a presenting a dark green pattern, feature points 1302b presenting a light green pattern and feature points 1302c presenting a red pattern, further includes feature points 1302d presenting a gray pattern. the proportions of the number of the above feature points 1302a, 1302b, 1302c and 1302d in the total number of feature points are 40%, 15%, 30% and 15%, respectively. As can be seen from distribution of the proportions, the entropy map 1302 may be classified as a false entropy map.

By training the above-described neural network model with a large number of above classified true entropy maps and false entropy maps, a neural network model capable of judging whether an entropy map is true or false is obtained. Thereby, after classifying the entropy map 1201 as a true entropy map, the neural network model may output a result indicating that the target fingerprint image matches the reference fingerprint image. Similarly, after classifying the entropy maps 1301 and 1302 as false entropy maps, the neural network model may output a result indicating that the target fingerprint image does not match the reference fingerprint image.

Two methods for judging whether the images match or not has been described in detail above with reference to the entropy map in various embodiments. Using the neural network model for the judgment will notably simplify the matching operation and accelerate output of the matching result, so that a large number of entropy maps may be processed. Further, the above embodiments only exemplarily describe the method for distinguishing true and false entropy maps, and those skilled in the art may make adaptive settings and amendments to the method according to factors such as the presentation mode of the entropy map.

The method 100 for fingerprint image recognition of the present disclosure have been described in detail above in conjunction with FIGS. 1 to 13c. Through the above description, those skilled in the art will appreciate that in the solution of the present disclosure, target feature points acquired from the target fingerprint image are ranked and then compared to form an entropy map, and then fingerprint recognition is performed by determining whether the target fingerprint image matches the reference fingerprint image according to the entropy map. It can be seen that the solution of the present disclosure makes full use of the acquired image information of the target fingerprint image for fingerprint recognition, thereby significantly improving the accuracy and effectiveness of fingerprint recognition. In particular, for fingerprint images obtained by miniaturized fingerprint acquisition sensors, the solution of the present disclosure is based on efficient use of image information, resulting in better recognition accuracy than existing fingerprint recognition schemes.

Figure 14:
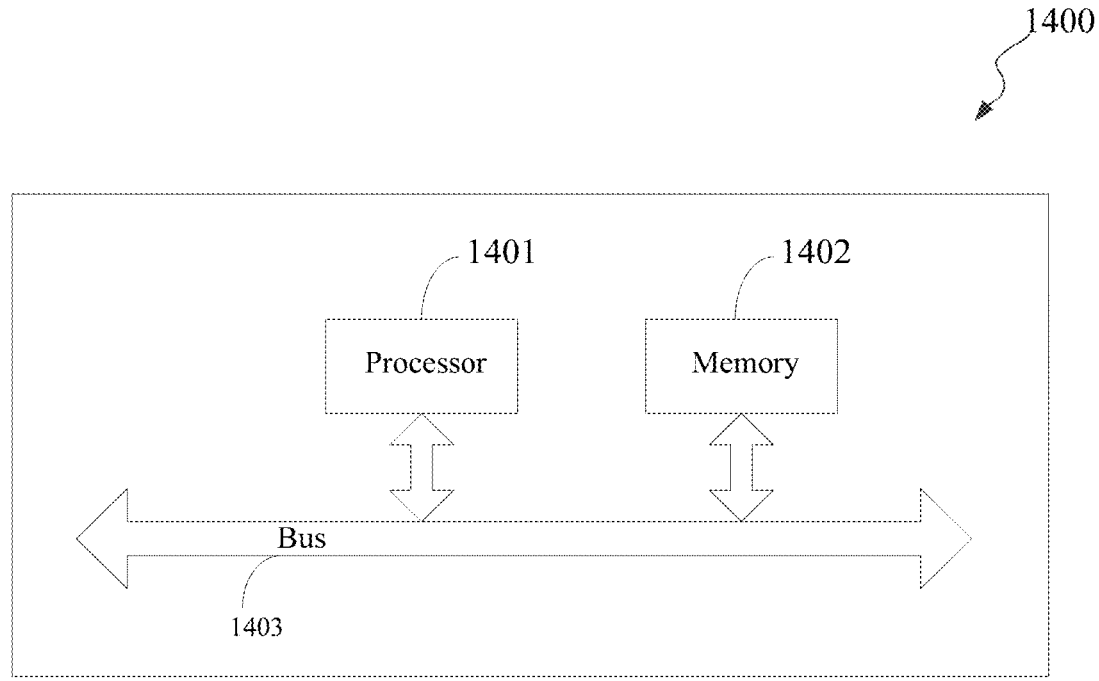
FIG. 14 is a block diagram of a device for fingerprint image recognition according to an embodiment of the present disclosure.

FIG. 14 is a block diagram of a device 1400 for fingerprint image recognition according to an embodiment of the present disclosure.

As shown in FIG. 14, the device 1400 for fingerprint image recognition of the present disclosure may include a processor 1401 and a memory 1402, wherein the processor 1401 and the memory 1402 communicate with each other via a bus 1403. The memory 1402 stores program instructions executable by the processor 1401, and the program instructions, when executed by the processor 1401, cause the device to perform the method steps as described above in conjunction with the figures. With the device of the present disclosure, the acquired image information of the target fingerprint image can be fully used for fingerprint recognition, thereby significantly improving the accuracy of fingerprint recognition.

Those of ordinary skill in the art will understand that: all or part of the steps of implementing the above method embodiments may be performed by hardware associated with the program instructions, and the program may be stored in a non-transitory computer-readable medium, and when executed, causes the steps including the above method embodiments to be implemented.

Through the description of the above implementations, those skilled in the art can clearly understand that the implementations may be implemented by means of software plus a necessary general hardware platform. Obviously, it may also be implemented by hardware. Based on such understanding, the technical solutions of the present invention essentially or, in other words, a part thereof contributing to the prior art, can be embodied in the form of a software product, wherein the computer software product may be stored in a computer-readable storage medium (such as an ROM/RAM, a disk, or an optical disc) and includes a number of instructions to make a computer device (which may be a PC, a server, or a network device, etc.) to execute the methods described in the various embodiments, or in a certain portion thereof, of the present disclosure.

It should be understood that the terms "first," "second," "third," and "fourth," etc. in the claims, description, and drawings of the present disclosure are used to distinguish between different objects, and are not used to describe a particular order. The terms "includes" and "including,"

when used in the description and claims of the present disclosure, specify the presence of stated features, integers, steps, operations, elements, and/or components, but do not preclude the presence or addition of one or more other features, integers, steps, operations, elements, components, and/or groups thereof.

It is also to be understood that the terminology used in the description of the disclosure herein is for the purpose of describing particular embodiments only, and is not intended to be limiting of the disclosure. As used in the specification and claims of the disclosure, the singular forms "a", "an" and "the" are intended to include the plural forms as well, unless the context clearly indicates otherwise. It should be further understood that the term "and/or" as used in the description and claims of the disclosure refers to any and all possible combinations of one or more of the associated listed items and includes such combinations.

The above embodiments are only used to illustrate the technical solutions of the embodiments of the present disclosure, but not to limit the same; although embodiments of the present disclosure have been described in detail with reference to the foregoing embodiments, those of ordinary skill in the art will understand that: the technical solutions described in the foregoing embodiments may still be modified, or some or all of the technical features therein may be equivalently replaced; such modifications or substitutions do not depart from the scope of the embodiments of the present disclosure by the essence of the corresponding technical solutions.

What is claimed is:

1. A method for fingerprint image recognition, the method comprising:
    ranking a plurality of target feature points acquired from a target fingerprint image according to a feature point attribute;
    comparing the ranked plurality of target feature points with a plurality of reference feature points in a reference fingerprint image to form an entropy map, wherein the entropy map indicates similarity between the target fingerprint image and the reference fingerprint image; and
    determining whether the target fingerprint image matches the reference fingerprint image according to the entropy map.

2. The method according to claim 1, wherein the feature point attribute comprises sharpness and/or shape uniqueness of the target feature point, and ranking the plurality of target feature points according to the feature point attribute comprises:
    ranking the target feature points according to whether the target feature points meet predetermined requirements regarding sharpness and/or shape uniqueness.

3. The method according to claim 2, wherein ranking the plurality of target feature points comprises:
    dividing the plurality of target feature points into first-level feature points, second-level feature points, and third-level feature points according to the feature point attribute, wherein the first-level feature point satisfies predetermined requirements regarding both the sharpness and the shape uniqueness, the second-level feature point satisfies predetermined requirements regarding one of the sharpness and the shape uniqueness, and the third-level feature point does not satisfy predetermined requirements regarding any of the sharpness and the shape uniqueness.

4. The method according to claim 2, wherein the feature point attribute further comprises an information volume proportion regarding an information volume contained in the target feature point, wherein the information volume proportion is related to a position of the target feature point in the target fingerprint image.

5. The method according to claim 4, wherein the target feature point located within a boundary of the target fingerprint image has an information volume proportion of 100%, while the information volume proportion of the target feature point located on the boundary of the target fingerprint image is proportional to an area of the target feature point within the boundary.

6. The method according to claim 1, wherein comparing the ranked plurality of target feature points with the plurality of reference feature points comprises:
    generating at least one target feature point set based on the plurality of target feature points, wherein each target feature point set comprises at least two of the target feature points, and each target feature point set has a corresponding joint level; and
    comparing each target feature point set with the plurality of reference feature points in the reference fingerprint image.

7. The method according to claim 1, wherein comparing the plurality of target feature points with the plurality of reference feature points in the reference fingerprint image to form the entropy map comprises:
    performing, based on the level of each target feature point, a similarity comparison on each target feature point and each corresponding reference feature point in the reference fingerprint image, to obtain a similarity score of each target feature point;
    comparing each similarity score to a predetermined threshold or threshold range to obtain a comparison result, wherein the comparison result is associated with a presentation mode; and
    presenting each target feature point in a corresponding presentation mode according to the comparison result to form the entropy map.

8. The method according to claim 7, wherein presenting each target feature points according to the comparison result comprises:
    presenting each target feature point in a preset color according to the comparison result.

9. The method according to claim 6, wherein comparing the plurality of target feature points with the plurality of reference feature points in the reference fingerprint image to form the entropy map comprises:
    performing, based on the level of each target feature point, the similarity comparison on each target feature point set and each reference feature point set in the reference fingerprint image, to obtain a similarity score of each target feature point set;
    comparing each similarity score to a predetermined threshold or threshold range to obtain a comparison result, wherein the comparison result is associated with a presentation mode; and
    presenting each target feature point set in a corresponding presentation mode according to the comparison result to form the entropy map.

10. The method according to claim 9, wherein presenting each target feature point set according to the comparison result comprises:
    presenting each target feature point set in a preset color according to the comparison result.

11. The method according to claim 7, wherein determining whether the target fingerprint image matches the reference fingerprint image according to the entropy map comprises:
determining whether the target fingerprint image matches the reference fingerprint image according to the number of, and/or a size of an occupied area of, target feature points in a preset presentation mode in the entropy map.

12. The method according to claim 1, wherein determining whether the target fingerprint image matches the reference fingerprint image according to the entropy map comprises:
inputting the entropy map to a trained neural network model to classify the entropy map as a true entropy map or a false entropy map;
determining that the target fingerprint image matches the reference fingerprint image in response to the entropy map classified as a true entropy map; and
determining that the target fingerprint image does not match the reference fingerprint image in response to the entropy map classified as a false entropy map.

13. A device for fingerprint image recognition, the device comprising:
a processor; and
a memory storing program instructions executable by the processor, wherein the program instructions, when executed by the processor, cause the device to perform the operations of:
ranking a plurality of target feature points acquired from a target fingerprint image according to a feature point attribute;
comparing the ranked plurality of target feature points with a plurality of reference feature points in a reference fingerprint image to form an entropy map, wherein the entropy map indicates similarity between the target fingerprint image and the reference fingerprint image; and
determining whether the target fingerprint image matches the reference fingerprint image according to the entropy map.

14. The device according to claim 13, wherein the feature point attribute comprises sharpness and/or shape uniqueness of the target feature point, and the program instructions, when executed by the processor, cause the device to perform the operations of:
ranking the target feature points according to whether the target feature points meet predetermined requirements regarding sharpness and/or shape uniqueness.

15. The device according to claim 14, wherein the program instructions, when executed by the processor, cause the device to perform the operations of:
dividing the plurality of target feature points into first-level feature points, second-level feature points, and third-level feature points according to the feature point attribute, wherein the first-level feature point satisfies predetermined requirements regarding both the sharpness and the shape uniqueness, the second-level feature point satisfies predetermined requirements regarding one of the sharpness and the shape uniqueness, and the third-level feature point does not satisfy predetermined requirements regarding any of the sharpness and the shape uniqueness.

16. The device according to claim 14, wherein the feature point attribute further comprises an information volume proportion regarding an information volume contained in the target feature point, wherein the information volume proportion is related to a position of the target feature point in the target fingerprint image.

17. The device according to claim 16, wherein the target feature point located within a boundary of the target fingerprint image has an information volume proportion of 100%, while the information volume proportion of the target feature point located on the boundary of the target fingerprint image is proportional to an area of the target feature point within the boundary.

18. The device according to claim 13, wherein the program instructions, when executed by the processor, cause the device to perform the operations of:
generating at least one target feature point set based on the plurality of target feature points, wherein each target feature point set comprises at least two of the target feature points, and each target feature point set has a corresponding joint level; and comparing each target feature point set with the plurality of reference feature points in the reference fingerprint image.

19. The device according to claim 13, wherein the program instructions, when executed by the processor, cause the device to perform the operations of:
performing, based on the level of each target feature point, the similarity comparison on each target feature point and each corresponding reference feature point in the reference fingerprint image, to obtain a similarity score of each target feature point;
comparing each similarity score to a predetermined threshold or threshold range to obtain a comparison result, wherein the comparison result is associated with a presentation mode; and
presenting each target feature point in a corresponding presentation mode according to the comparison result to form the entropy map.

20. The device according to claim 19, wherein the program instructions, when executed by the processor, cause the device to perform the operations of:
presenting each target feature point set in a preset color according to the comparison result.

21. The device according to claim 18, wherein the program instructions, when executed by the processor, cause the device to perform the operations of:
performing, based on the level of each target feature point, the similarity comparison on each target feature point set and each reference feature point set in the reference fingerprint image, to obtain a similarity score of each target feature point set;
comparing each similarity score to a predetermined threshold or threshold range to obtain a comparison result, wherein the comparison result is associated with a presentation mode; and
presenting each target feature point set in a corresponding presentation mode according to the comparison result to form the entropy map.

22. The device according to claim 21, wherein the program instructions, when executed by the processor, cause the device to perform the operations of:
presenting each target feature point set in a preset color according to the comparison result.

23. The device according to claim 19, wherein the program instructions, when executed by the processor, cause the device to perform the operations of:
determining whether the target fingerprint image matches the reference fingerprint image according to the number of, and/or a size of an occupied area of, target feature points in a preset presentation mode in the entropy map.

24. The device according to claim 13, wherein the program instructions, when executed by the processor, cause the device to perform the operations of:
- inputting the entropy map to a trained neural network model to classify the entropy map as a true entropy map or a false entropy map;
- determining that the target fingerprint image matches the reference fingerprint image in response to the entropy map classified as a true entropy map; and
- determining that the target fingerprint image does not match the reference fingerprint image in response to the entropy map classified as a false entropy map.

25. A non-transitory computer-readable medium storing thereon program instructions for fingerprint image recognition, the program instructions, when executed by at least one processor, causing the following operations to be implemented:
- ranking a plurality of target feature points acquired from a target fingerprint image according to a feature point attribute;
- comparing the ranked plurality of target feature points with a plurality of reference feature points in a reference fingerprint image to form an entropy map, wherein the entropy map indicates similarity between the target fingerprint image and the reference fingerprint image; and
- determining whether the target fingerprint image matches the reference fingerprint image according to the entropy map.

* * * * *